US012143381B2

(12) United States Patent
Singhvi

(10) Patent No.: US 12,143,381 B2
(45) Date of Patent: Nov. 12, 2024

(54) MULTIPLE HOST WEB AUTHENTICATION ON THE SAME PORT USING SEGMENT SECURITY

(71) Applicant: Arista Networks, Inc., Santa Clara, CA (US)

(72) Inventor: Manish Singhvi, Jodhpur (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 254 days.

(21) Appl. No.: 17/748,981

(22) Filed: May 19, 2022

(65) Prior Publication Data

US 2023/0379328 A1    Nov. 23, 2023

(51) Int. Cl.
| | |
|---|---|
| *H04L 29/06* | (2006.01) |
| *H04L 9/40* | (2022.01) |
| *H04L 29/08* | (2006.01) |
| *H04L 61/103* | (2022.01) |
| *H04L 61/5014* | (2022.01) |

(52) U.S. Cl.
CPC ........ *H04L 63/0876* (2013.01); *H04L 61/103* (2013.01); *H04L 61/5014* (2022.05); *H04L 63/0236* (2013.01); *H04L 63/20* (2013.01)

(58) Field of Classification Search
CPC ............. H04L 63/0876; H04L 61/5014; H04L 61/103; H04L 63/0236
USPC .......................................................... 726/4
See application file for complete search history.

(56) References Cited

U.S. PATENT DOCUMENTS

| | | | | |
|---|---|---|---|---|
| 10,341,185 B2* | 7/2019 | Dale | ....................... | H04L 41/12 |
| 10,728,096 B2* | 7/2020 | DeBolle | .................. | H04L 63/20 |
| 11,658,976 B2* | 5/2023 | Singhvi | ................. | H04L 63/101 |
| | | | | 726/27 |
| 2012/0210011 A1* | 8/2012 | Liu | ..................... | H04W 12/082 |
| | | | | 709/229 |
| 2014/0245395 A1* | 8/2014 | Hulse | ................. | H04W 12/068 |
| | | | | 726/4 |
| 2014/0366117 A1* | 12/2014 | Kumar | .................... | H04L 63/10 |
| | | | | 726/11 |

(Continued)

*Primary Examiner* — Haresh N Patel
(74) *Attorney, Agent, or Firm* — Fountainhead Law Group, PC

(57) ABSTRACT

In general, embodiments relate to a method for managing a network device, including receiving an incoming frame originating from a host, where the incoming frame includes IP address of the host and a payload specifying information associated with an external server. The further includes determining, using the IP address of the host and an IP address to segment identifier (ID) mapping, that the host is associated with a first segment, in response to the determining, forwarding the incoming frame towards a redirection server executing on the network device, where the first segment is associated with a first policy and where the first policy specifies that the incoming frame is to be forwarded to the redirection server. The method further includes receiving a redirection frame including a uniform resource locator (URL) of a captive portal, transmitting the redirection frame towards the host, wherein the user of the host is authenticated by the captive portal based, at least in part, on the redirection frame, and associating, after the user of the host has been authenticated by the captive portal, the host with a second segment, where the segment second permits the host to access the external server.

20 Claims, 5 Drawing Sheets

(56) References Cited

U.S. PATENT DOCUMENTS

| | | | | |
|---|---|---|---|---|
| 2018/0097787 A1* | 4/2018 | Murthy | ............... | H04L 63/08 |
| 2018/0097788 A1* | 4/2018 | Murthy | ............... | H04L 63/102 |
| 2018/0097789 A1* | 4/2018 | Murthy | ............... | H04L 63/0227 |
| 2018/0097840 A1* | 4/2018 | Murthy | ............... | H04L 63/02 |
| 2020/0366794 A1* | 11/2020 | Lee | ............... | H04W 60/00 |
| 2022/0239654 A1* | 7/2022 | Singhvi | ............... | H04L 63/0245 |

* cited by examiner

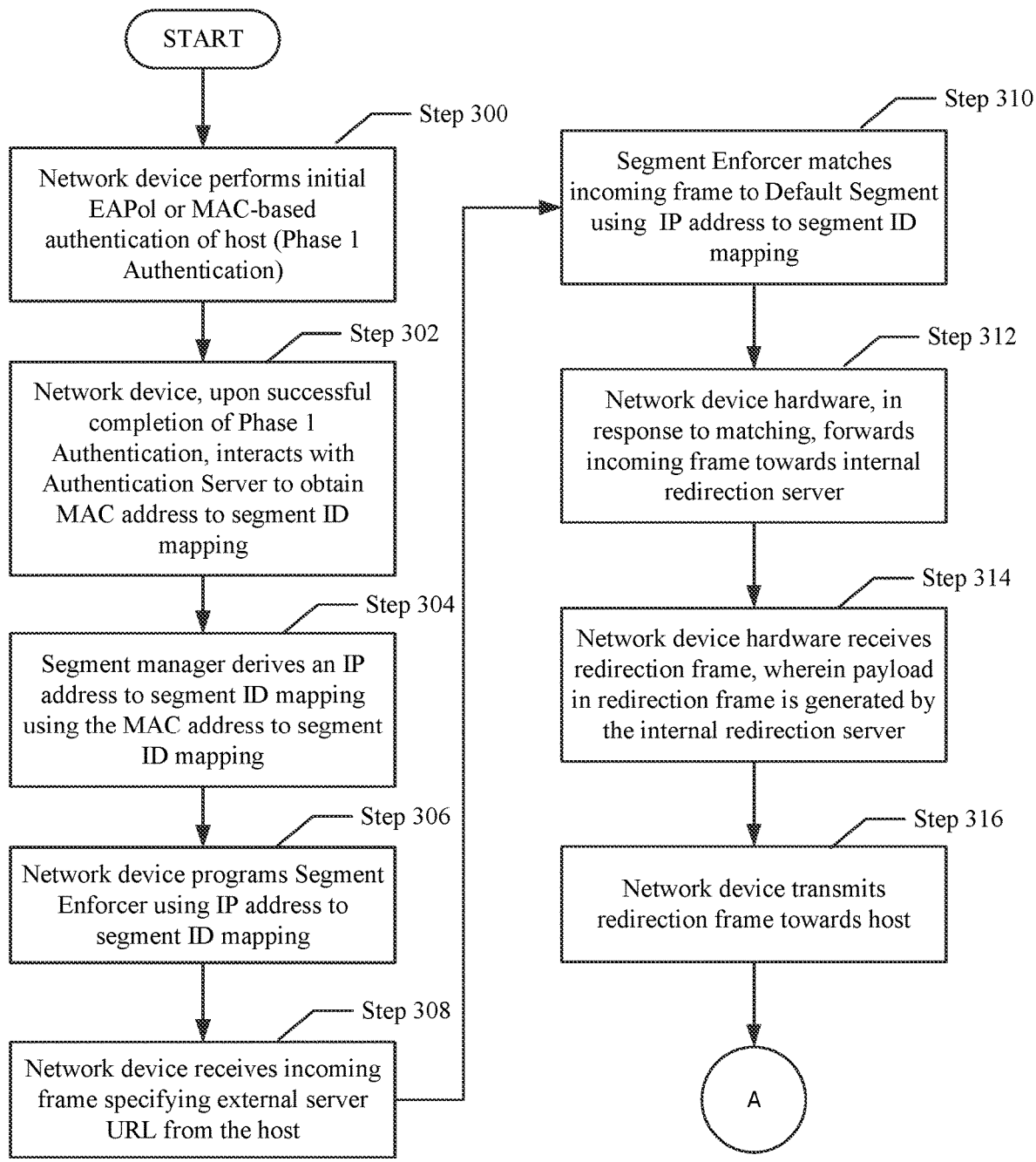
FIG. 3.1

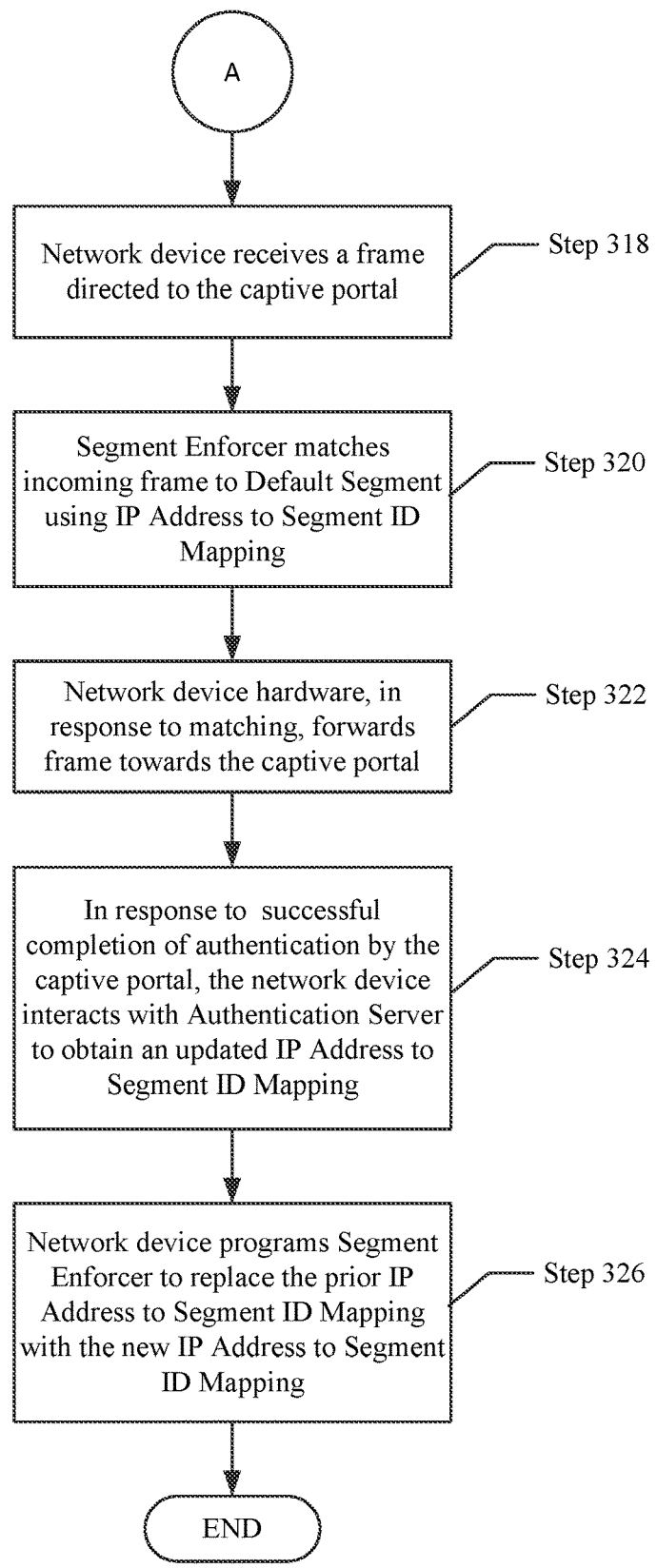
FIG. 3.2

MULTIPLE HOST WEB AUTHENTICATION ON THE SAME PORT USING SEGMENT SECURITY

BACKGROUND

Network devices (e.g., switches) include functionality to enable a user (via a host) to access external servers connected to the network devices over a network. In certain scenarios, a user needs to be authenticated prior to the network device(s) permitting the user to access the external servers.

BRIEF DESCRIPTION OF DRAWINGS

FIGS. 3.1 and 3.2 show a method, performed by a network device, for processing an incoming request frame, redirecting the request to a redirection server, transmitting a redirection frame towards a captive portal, and subsequently processing of additional frames once the captive portal authentication is successfully completed in accordance with one or more embodiments of the disclosure.

DETAILED DESCRIPTION

Figure 1:
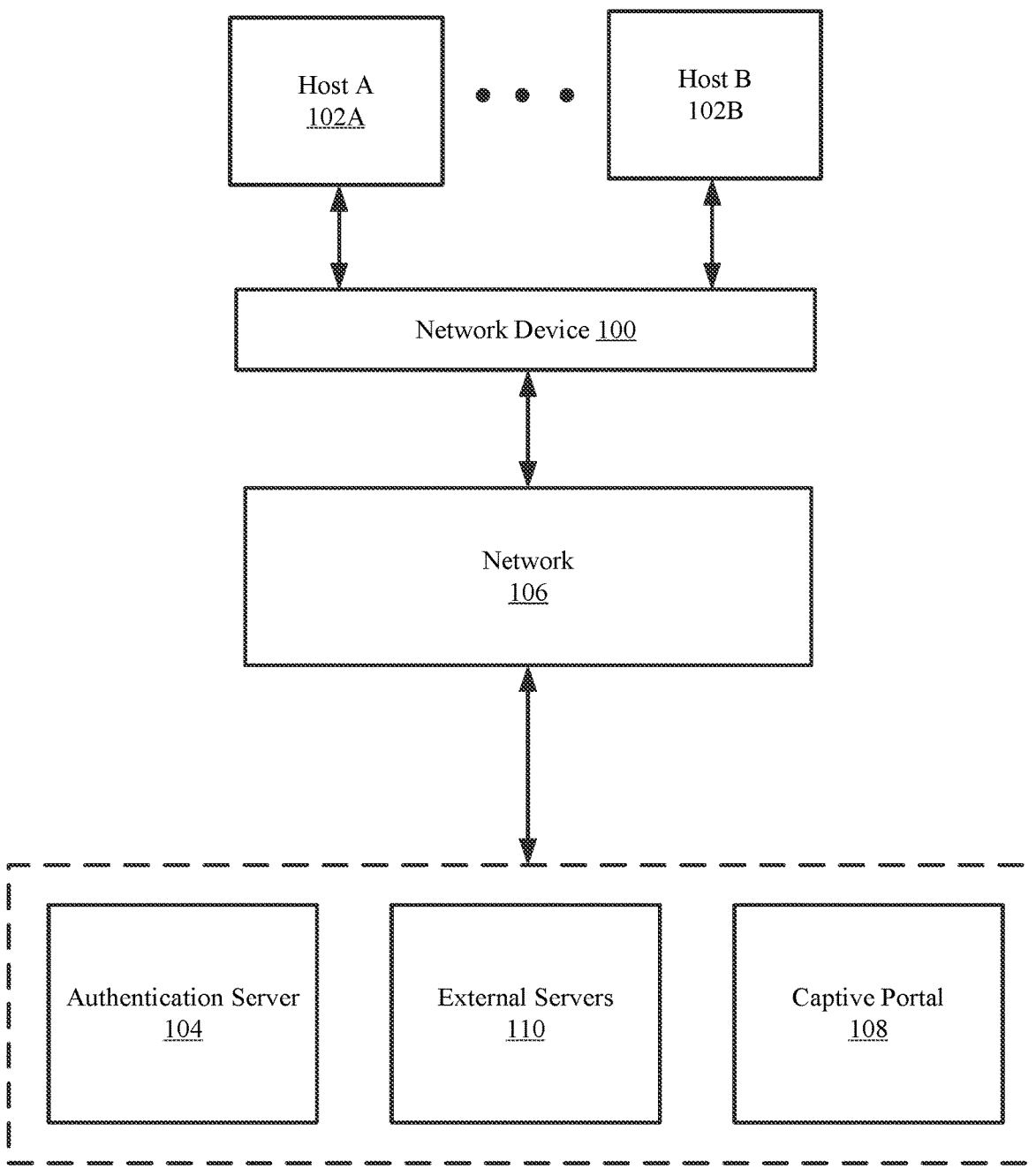
FIG. 1 shows an example system in accordance with one or more embodiments of the disclosure.

Authentication using both IEEE 802.1x authentication and captive portal authentication is used to authenticate users that are attempting to use a network device to access websites on the Internet or other resources on the Internet. Prior to successfully authenticating a user, the user may have limited ability to access the Internet.

Conventionally, after a host connects to a port on a network device, the host and the network device will perform media access control (MAC) based authentication (MBA) or IEEE 802.1x Extensible Authentication Protocol (EAP) over LAN (EAPoL)). Once the host is authenticated using IEEE 802.1x EAPoL or MBA, the access control list (ACL) associated with the port (i.e., on the port of the network device to which the host is connected) is updated to permit certain network traffic. At a later point in time, the user (via the host) may attempt to access an external website (e.g., www.company.com); however, the user has not successfully completed the captive portal authentication. Accordingly, when the user attempts to access the website, the packet (i.e., the packet that includes the URL of the website) is trapped and, based on the ACL associated with the port, the packet is sent to a redirection server on the network device. The redirection server, in response to receiving the packet, generates a response packet that includes a URL for the captive portal server (which is external to the network device). The response packet is then transmitted back to the host. The host subsequently attempts to access the captive portal using the URL in the response packet. The network device, based on the ACL associated with the port, permits the request to be transmitted to the captive portal. Once the host is able to connect to the captive portal, the user of the host is authenticated by the captive portal. At this stage, the captive portal notifies the AAA server, which eventually notifies the network device that the host has successfully authenticated with the captive portal. The network device subsequently updates the ACL for the port (i.e., the port of the network device to which the host is connected) to allow network traffic from the host to be forwarded by the network device toward, e.g., the external website.

If a second host connects to the aforementioned port at a later point in time, the second host will also need to be authenticated in the same manner as the host. However, because the ACL is specified at the port level, ACL will need to be updated when the second host connects to the port and each time the second host successfully completes the various phases of authentication. The updating of the ACL in response to authentication of the second host will disrupt traffic issued by the host. Further, as the number of hosts connected to a given port increases, the updating of the ACL for the port will result in increasingly negative impacts on other hosts that are already connected and successfully authenticated. Thus, the use of per-port ACLs may limit the scalability of such an implementation.

To address this and other issues, embodiments of the technology relate to using segment security. More specifically, in one or more embodiments, the network device is configured to support a set of segments (which may be specified by the administrator). Each of these segments is associated with its own level of access and is identified using a segment identifier (ID). A given host may be assigned to a given segment using: (i) a MAC address to Segment ID mapping and/or (ii) an IP address to segment ID mapping. Thus, instead of enforcing network device policies using per port ACLs, one or more embodiments uses network device level defined segments. In this manner, multiple hosts may be connected to a single port, where these hosts may be at different phases of authentication (i.e., not authenticated, authenticated using IEEE 802.1x, authenticated via captive portal) and the actions of one host do not impact other hosts.

The following describes an example of one or more embodiments of the technology.

Turning to the example, consider a scenario in which the host is configured with two segments: (i) a default segment and (ii) an authenticated segment. The host is associated with the default segment once a host is authenticated using 802.1x. The default segment enables the host to issue DHCP requests and ARP requests and participate in the captive portal authentication process (including access to the captive portal); however, the host is not permitted to access external websites. Further, while the host is associated with the default segment, when a packet that specifies an URL for an external website is received, the packet is forwarded to an internal redirection server as part of the captive portal authentication. The host is associated with the authenticated segment when the host has been successfully authenticated using captive portal authentication. Once the host is associated with the authenticated segment, the host is permitted to access external websites. The protocols specified above with respect to the default segment are not intended to limit the scope of the technology.

Using the aforementioned segment configuration, when a host initially connects to the network device on a port, it will undergo authentication using 802.1x or MAC based authentication. Upon successful authentication, the host (represented by its MAC address) is associated with a default segment (i.e., a MAC address to segment ID mapping is created). The host may then obtain an IP address, e.g., using DHCP. Once the host is associated with an IP address, the MAC address-segment ID mapping is updated to an IP address—Segment ID mapping. At a later point in time, a network device may receive a packet that includes a URL for an external web site. Based on the source IP address of the packet (which is the IP address of the host), the IP address—Segment ID mapping is used to identify that the host is associated with the default segment. The packet is then processed in accordance with the policies associated with the default segment. In this example, the packet is forward (based on the aforementioned policies) to the redirection server on the network device.

The redirection server, in response to receiving the packet, generates a response packet that includes a URL for the captive portal server (which is external to the network device). The response packet is then transmitted back to the host. The host subsequently attempts to access the captive portal using the URL in the response packet. The network device permits the request to be transmitted to the captive portal. Once the host is able to connect to the captive portal, the user of the host is authenticated by the captive portal. At this stage, the captive portal notifies the AAA server, which then notifies the network device that the host has successfully authenticated with the captive portal. The network device subsequently updates the IP address to segment ID mapping to reflect that the host is now in the authenticated segment. Once the aforementioned update is made, the packets issued by the host will now be processed using policies associated with the authenticated segment, which permits the packets directed to external URLs to be forwarded by the network device (as opposed to being dropped when the host was associated with the default segment).

If a second host connects to the port it will be going through the same process as the host. The packets issued by the second host will be processed independently of the packets issued by the host and in accordance with the MAC address-segment ID mapping (or IP address-segment ID mapping) associated with the second host. Thus, the operation of the host will not be impacted as a second host (or other hosts) connect to the port. Similarly, multiple such hosts can perform captive portal authentication anytime. Thus, no frames issued by the first host (which has been successfully authenticated) are dropped by the network device while the second host is undergoing the two-phase authentication.

Various embodiments of the disclosure are described below.

FIG. 1 shows an example system in accordance with one or more embodiments of the disclosure. The system includes a network device (100) connected to one or more hosts (102A, 102B), a network (106), an authentication server (104), one or more external servers (110) and a captive portal(s) (108). Network device (100) is connected to a captive portal (108) and an external server(s) (110) through network (106). Network device (100) is further connected to the authentication server (104). Further, the captive portal (108) and the authentication server (104) are directly or indirectly connected. Each of these components is described below.

In one embodiment of the disclosure, the captive portal (108) and the authentication server (104) may be co-located. For example, the captive portal (108) may be part of or connected to the authentication server (104).

In one embodiment of the disclosure, the network device (100) may be one or more computing devices functionally equipped to process a frame by facilitating implementation of segments to achieve redirection of a HTTP[S] request to a captive portal.

In one embodiment of the disclosure, the network device (100) is a physical or virtual device that may be used for performing various embodiments of the disclosure. The physical device may correspond to any physical system with functionality to implement one or more embodiments of the disclosure. For example, the physical device may be a switch (i.e., a device with at least one or more processor(s), memory, and an operating system) that is directly (or operatively, e.g., via the network) connected to at least one host (e.g., 102A, 102B), an authentication server (e.g., 104), and to a captive portal (e.g., 108), and an external server(s) (e.g., 110). In another embodiment, the network device (100) is a physical device that includes persistent storage, memory (e.g., random access memory), one or more processor(s), and two or more physical ports that may be a combination of ingress and egress ports.

Alternatively, the physical device may be a special purpose computing device that includes one or more application-specific processor(s) (or hardware) configured to execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, the network device (100) includes executable instructions (stored in a non-transitory computer readable medium (not shown)), which when executed, enable the network device (100) to perform one or more methods described below (see e.g., FIGS. 3.1-4). Additional detail about the network device is described below with respect to FIG. 2.

In one embodiment of the disclosure, the persistent storage in the network device may include any type of non-transitory computer readable medium that includes instructions, which, when executed by one or more processor(s) in the network device, enable the network device to perform all or a portion of the functions described in accordance with one or more embodiments of the disclosure (see e.g., FIGS. 3.1-4).

Examples of a network device include, but are not limited to, a router, a switch, and a multilayer switch. The network device is not limited to the aforementioned specific examples. Additional detail about a network device is described below with respect to FIG. 2.

In one embodiment of the disclosure, the network (106) may be the medium through which the network device (100), the hosts (102A, 102B), the authentication server (104), the captive portal (108), and the external server(s) (110) are connected. In one embodiment of the disclosure, the network may include other network devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

In one embodiment, each of the hosts (e.g., 102A, 102B) may be one or more computing devices functionally equipped to transmit one or more HTTP[S] requests intended for one of the external servers (110) to ultimately achieve access to a network.

In one embodiment of the disclosure, each of the hosts (102A, 102B) is a physical or virtual device that may be used for performing various embodiments of the disclosure. The physical device may correspond to any physical system with functionality to implement one or more embodiments of the disclosure. For example, the physical device may be a personal computer, a laptop, a smartphone, or a tablet (i.e., a device with at least one or more processor(s), memory, and an operating system) that is directly or otherwise connected to a network device (100).

Alternatively, the physical device may be a special purpose computing device that includes one or more application-specific processor(s) (or hardware) configured to execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

In one embodiment of the disclosure, each of the hosts (e.g., 102A, 102B) includes executable instructions (stored in a non-transitory computer readable medium (not shown)), which when executed, enable the corresponding host (e.g., 102A, 102B) to perform at least a portion of one or more methods described below (see e.g., FIGS. 3.1-4).

In one embodiment of the disclosure, a host may include functionality for storing commands obtained from internal or external application(s) for transmission of HTTP[S] requests to a network device (e.g., network device (100)).

In one embodiment of the disclosure, the external server(s) (e.g., 110) is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or otherwise connected to a network device (e.g., the network device (100)).

In one or more embodiments of the disclosure, the external servers (110) host one or more web pages. These web pages are the target of the HTTP[S] requests issued by the host.

In one embodiment of the disclosure, the captive portal (e.g., 108) may be a web page (e.g., http://company.com), where a user may enter authentication credentials for allowing the user access to a network that is otherwise, at least in part, blocked to the user. The captive portal may be implemented with executable instructions (stored in a non-transitory computer readable medium (not shown)), which when executed, enable a processor (not shown) to implement a web page onto which a user may be authenticated. In another embodiment, the captive portal (108) may be executing on a host.

In one embodiment of the disclosure, the captive portal implements functionality for receiving user authentication credentials (e.g., username and password) from one of the hosts (102A, 102B) through the network device (100) and the network (106), and validating the received user authentication credentials against a database of captive portal authentications. That is, the captive portal identifies the authentication session through an authentication server (e.g., 104, in FIG. 1) and records the user authentication credentials. The captive portal may compare the user authentication credentials, received via a host (e.g., 102A, 102B), e.g., to an internal database of captive portal authentications. In response to a match determination between the user authentication credentials and the captive portal authentications, the captive portal may report successful user authentication to an authentication server (e.g., 104) and the user is ultimately granted access to a network. In response to finding no match between the user authentication credentials and the database of captive portal authentications, a user is blocked from full access to the network.

In one embodiment of the disclosure, the authentication server (e.g., 104, in FIG. 1) is a physical or virtual device that may be used for facilitating various embodiments of the disclosure. The physical device may correspond to any physical system with functionality to implement one or more embodiments of the disclosure. For example, the physical device may be a computing device (i.e., a device with at least one or more processor(s), memory, and an operating system) that is directly or operationally connected to a network device (e.g., 100) and a captive portal (e.g., 108).

In one embodiment of the disclosure, the authentication server (e.g., 104) includes executable instructions (stored in a non-transitory computer readable medium (not shown)), which when executed, upon successful completion of a user authentication session by a captive portal (e.g., 108), issues a Radius change of authorization (CoA) message to the network device to complete the authentication to enable unrestricted access to a previously restricted network by changing the segment ID of the host. In another embodiment, a Radius Disconnect message may be used to disconnect the host and then give the host full access during re-authentication.

In one or more embodiments of the disclosure, the authentication server (104) may be implemented as any type of computing device (e.g., a physical or virtual device, as described above) with functionality for performing the methods and embodiments of the disclosure. The authentication server (104) may authenticate a user in various manners including in accordance with the IEEE 802.1X protocol—Extensible Authentication Protocol over Local Area Network (EAPoL) or media access control address (MAC)-based authentication (e.g., via the remote authentication dial-in service (RADIUS) protocol) or both one after the other in case one of them fails. The authentication server (104) may implement further functionality such as initiating an authentication session to authenticate a host and receiving authentication status from a captive portal (e.g., 108).

In one embodiment of the disclosure, the authentication server (104) includes executable instructions (stored in a non-transitory computer readable medium (not shown)), which when executed, enable the authentication server (104) to perform at least a portion of the one or more methods described below (see e.g., FIGS. 3.1-4).

While FIG. 1 shows a particular system architecture, the disclosure is not limited to the system architecture shown in FIG. 1. For example, while FIG. 1 shows one authentication server, one captive portal, and one network device, implementations of the disclosure may include one or more of each of the aforementioned elements without departing from the disclosure.

Figure 2:
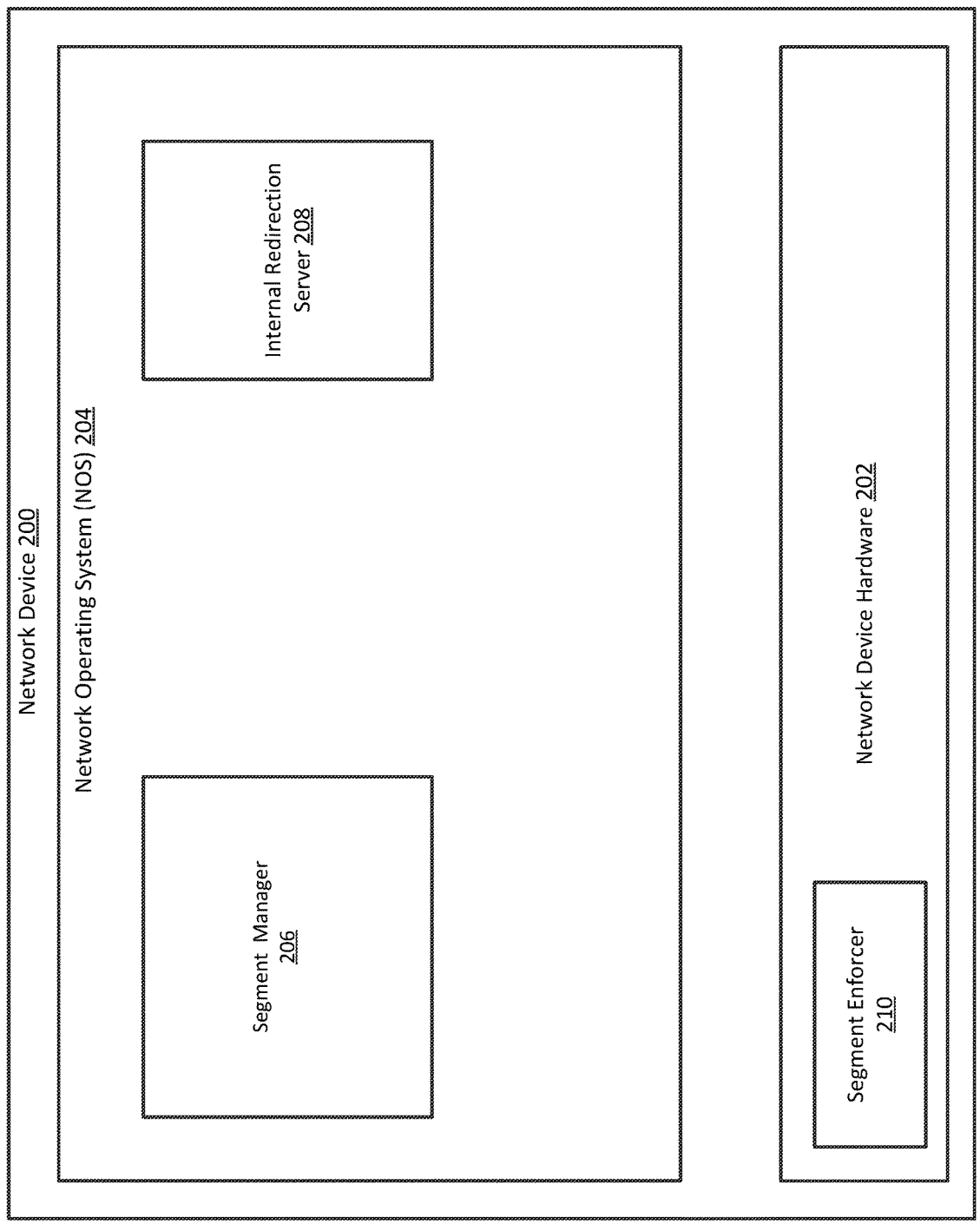
FIG. 2 shows a diagram of a network device in accordance with one or more embodiments of the disclosure.

FIG. 2 shows a network device in accordance with one or more embodiments of the disclosure. In one embodiment of the disclosure, a network device (200) includes network device hardware (202) and a network operating system (NOS) (204). In one embodiment of the disclosure, the network device (200) may correspond to the network device (100) of FIG. 1.

In one embodiment of the disclosure, the NOS (204) includes a segment manager (206) and an internal redirection server (208). In one embodiment of the disclosure, the network device hardware (202) includes a segment enforcer (210). In one embodiment of the disclosure, the NOS (204) implements an operating system kernel with functionality to manage the operation of the network device (200). This functionality includes the software components (or modules) required to: (i) generate and update MAC address to segment ID mappings and/or IP address to segment ID mappings and (ii) implement one or more components of the internal redirection server (208) as described throughout this disclosure. As a part of the processing, the NOS includes functionality to implement one or more protocols. Examples of protocols include, but are not limited to, Multi-Chassis Link Aggregation (MLAG), link aggregation groups (LAGs), Virtual Extensible Local Area Network (VXLAN), Link Layer Discovery Protocol (LLDP), tap aggregation, data center bridging capability exchange, Virtual Local Area Network (VLAN), Virtual Router Redundancy Protocol (VRRP), Virtual-Address Resolution Protocol (VARP), Spanning Tree Protocol (STP), Open Shortest Path First (OSPF), Border Gateway Protocol (BGP), Routing Information Protocol (RIP), Building Distribution Frame (BDF), Multi-Protocol Label Switching (MPLS), Protocol-Independent Multicast (PIM), Internet Control Message Protocol (ICMP), and Internet Group Management Protocol (IGMP).

Continuing with the discussion of FIG. 2, additional detail about each of the components illustrated in FIG. 2 is described below.

In one embodiment of the disclosure, the network device (200) includes executable instructions (stored in a non-transitory computer readable medium (not shown)), which when executed, enable the network device (200) to perform one or more methods described below (see e.g., FIGS. 3.1-4). In one embodiment, the network device (200) includes executable instructions, which when executed, enable the network device (200) to implement one or more components of the network device hardware (202) and the NOS (204).

In one embodiment of the disclosure, the NOS (204) includes executable instructions (stored in a non-transitory computer readable medium (not shown)), which when executed, enable the NOS (204) to perform one or more methods described below (see e.g., FIGS. 3.1-4). In one embodiment, the NOS (204) includes executable instructions, which when executed, enable a kernel (not shown) of the NOS (204) to implement one or more components of the segment manager (206) and the internal redirection server (208). Additional detail about the operation of the NOS is provided in FIGS. 3.1-4 below.

In one embodiment of the disclosure, the segment enforcer (210) implements functionality to match an incoming frame to zero, one, or more segment mappings (i.e., an IP address to segment ID mapping and/or a MAC address to segment ID mapping) and implements the policies associated with the segments identified in the segment mappings in a network device hardware (e.g., 202). The network device may implement any number of segments. As is discussed in further detail below the network device may implement, for example, a default segment and an authenticated segment. The default segment is associated with a policy that permits the frames to be transmitted to their intended destinations if the frames are related to Dynamic Host Configuration Protocol (DHCP), Address Resolution Protocol (DHCP), and/or are directed to a captive portal (which has been pre-configured by an administrator of the network device). The authenticated segment is associated with a policy that permits frames to be sent to external servers (e.g., 110, FIG. 1). The disclosure is not limited to the aforementioned segments and/or their related policies.

The segments (and related policies) may be configured by an administrator and may be defined at any level of granularity. However, at least one of the segments (and its associated policy) (e.g., a "default" segment) needs to permit frames that are required for the host to be authenticated with the captive portal. Once the captive portal has authenticated the host, the authentication server (e.g., 104, FIG. 1) may associate the authenticated host with any segment, where such segment may have greater or more limited access than the default segment.

Continuing with the discussion of FIG. 2, in one embodiment of the disclosure, the segment enforcer (210) may be implemented using a ternary content-addressable memory (TCAM) in the network device hardware. In this scenario, the TCAM is programmed with the segment mappings.

In one embodiment of the disclosure, the segment enforcer (210) is a physical or virtual device that may be used for performing various embodiments of the disclosure. The physical device may correspond to any physical system with functionality to implement one or more embodiments of the disclosure. The physical device may be a special purpose computing device that includes one or more application-specific processor(s) (or hardware) configured to execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In one embodiment of the disclosure, the segment enforcer (210) includes executable instructions (stored in a non-transitory computer readable medium (not shown)), which when executed, enable the segment enforcer (210) to perform one or more methods described below (see e.g., FIGS. 3.1-4). In one embodiment, the segment enforcer (210) includes executable instructions, which when executed, enable the segment enforcer (210) to implement the policies (which are associated with segments) on an incoming frame. Additional detail about the operation of the segment enforcer is provided in FIGS. 3.1-4 below.

In one embodiment of the disclosure, the segment manager (206) may be one or more computing devices functionally equipped to facilitate receiving, generating, and/or updating segment mappings, and providing the segments mappings to the segment enforcer of a network device hardware of the network device (200).

The segment manager includes functionality to receive information from the authentication server to initially generate a MAC address to segment ID mapping, where the MAC address in the aforementioned mapping is the MAC address of the host that has successfully performed MAC based authentication (see e.g., FIG. 3.1). Once the MAC address to segment ID mapping is generated, the segment manager includes functionality to obtain an IP address for the host (i.e., the host associated with the MAC address in the MAC address to segment ID mapping). Various embodiments for obtaining an IP address are provided in FIG. 3.

In one embodiment of the disclosure, the segment manager (206) is a physical or virtual device that may be used for performing various embodiments of the disclosure. The physical device may correspond to any physical system with functionality to implement one or more embodiments of the disclosure. The physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure. Additional detail about the operation of the segment manager is provided in FIGS. 3.1-4 below.

In an embodiment of the disclosure, in addition to the segment enforcer (210), the network device hardware (202) includes ports, one or more special purpose computing devices with functionality to receive an incoming frame from a host (e.g., 102A, . . . , 102B, FIG. 1), to permit or deny the incoming frame and/or redirect the host to a captive portal (e.g., 108, FIG. 1) under the direction of a segment enforcer (e.g., 210) and to provide the incoming frame to a control plane (e.g., the operating system kernel of the network operating system) for further processing (see e.g., FIGS. 3.1-4). The special purpose hardware may be, for example, an application-specific integrated circuit (ASIC) (not shown).

In an embodiment of the disclosure, the network device hardware (202) receives an incoming frame from a host, such as one of the hosts, through an ingress port of the network device (200) (not shown), and forwards the incoming frame to a network operating system (e.g., 204) for further processing. In an embodiment of the disclosure, the network device hardware (202) programs a TCAM based on the segment mappings and forwards an outgoing frame with a redirect response through an egress port (not shown) of the network device (200) to the host. Additional detail about the operation of the network device hardware is provided in FIGS. 3.1-4 below.

In one embodiment of the disclosure, the internal redirection server (208) of the NOS is a virtual device that may be used for facilitating performing various embodiments of the disclosure.

In one embodiment of the disclosure, the internal redirection server includes executable instructions (stored in a non-transitory computer readable medium (not shown)), which when executed, enable the redirection server to perform or assist in performing one or more methods described below (see e.g., FIGS. 3.1-4).

In one or more embodiments of the disclosure, the internal redirection server (208) may be implemented as any type of server with functionality for receiving a request payload from an operating system kernel, generating and transmitting a redirect response to the operating system kernel. For example, consider the scenario where the request payload is an arbitrary web address. The internal redirection server (208) generates the redirect response (e.g., HTTP[S] 302 redirect) to the request payload, which includes a captive portal uniform resource locator (URL). Additional detail about the operation of the internal redirection server is provided in FIGS. 3.1-4 below.

One skilled in the art will recognize that the architecture of the network device is not limited to the components shown in FIG. 2. For example, the network devices may each include components not shown in FIG. 2 or include alternate or fewer components as those shown in FIG. 2. In another example, while the network device hardware (202) and the NOS (204) are shown as distinct components, network device hardware (202) may be part of the NOS (204).

FIGS. 3.1 and 3.2 show a method, performed by a network device, for processing an incoming request frame, redirecting the request to a redirection server, transmitting a redirection frame towards the host to reach the captive portal, and subsequently processing of additional frames once the captive portal authentication is successfully completed in accordance with one or more embodiments of the disclosure. The method of FIGS. 3.1-3.2 may be performed by, for example, a network device (e.g., 100, FIG. 1 or 200, FIG. 2). Other components illustrated in FIGS. 1-2 may perform or assist in performing the method of FIG. 3 without departing from the disclosure.

While the various steps in the flowchart shown in FIGS. 3.1-3.2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 300, the network device performs an initial EAPol or MAC-based authentication of a host (e.g., one of the hosts 102A-102N, in FIG. 1)—Phase I of the two-phase authentication process.

In step 302, upon successful completion of phase one of the authentication process, the network device interacts with an authentication server (e.g., 104, FIG. 1) to generate a generate a MAC address to segment ID mapping, where the segment ID in the aforementioned mapping corresponds to the "default" segment and the MAC address corresponds to the MAC address of the host that was authenticated in Step 300. The authentication server may provide the aforementioned MAC address to segment ID mapping or information that is sufficient for the segment manager to generate the MAC address to segment ID mapping. In one embodiment, the authentication server includes functionality to determine which segment ID to include in the MAC address to segment ID mapping. Prior to generating the mapping in step 302, any frames related to DHCP and/or ARP that are issued by the host to the network device are dropped.

In step 304, the segment manager derives an IP address to segment ID mapping based on the MAC address to segment ID mapping. The segment manager may derive the IP address to segment ID mapping by: (i) obtaining the IP address from a network controller (or another external entity), selecting the IP address from a preset IP address range associated with the network device, or using any other mechanism for obtaining an IP address for the host and (ii) replacing the MAC address in the MAC address to segment ID mapping with the IP address to obtain the IP address to segment ID mapping.

In step 306, network device programs the IP address to segment ID mapping into the segment enforcer in the network device hardware. The programming may include programming a TCAM with the IP address to segment ID mapping. While the aforementioned embodiment discusses a TCAM, the disclosure is not limited to a segment enforcer that is a TCAM.

Once the IP address to segment ID mapping is established, the host may issue frames to the network device in accordance with DHCP and ARP. Based on the information obtained using the aforementioned protocols, the host may issue the frame referenced in Step 308.

In step 308, the network device hardware (e.g., 202, FIG. 2) of the network device receives an incoming frame from a host (e.g., one of the hosts 102A-102N, in FIG. 1) specifying information associated with an external server (i.e., to an external destination). In some embodiments of the disclosure, the information associated with the external server is a web page URL (e.g., http://company.com) hosted by the external server, the target destination of the host. Specifically, the payload of the incoming frame specifies the external server URL. At this stage, a user of the host has not been completely authenticated by the captive portal at the time when the incoming frame is received by the network device hardware. That is, at the time the network device receives the incoming frame from the host, phase two of the two-step authentication process (e.g., user authentication) is not yet complete and a user of the host is unauthorized to access the entirety of a network.

In step 310, the segment enforcer matches the incoming frame (or incoming network traffic) to an IP address to segment ID mapping. In some embodiments, the segment enforcer may compare the incoming network traffic with all programmed segment mappings for a match and if a match is not detected, the network device hardware may drop the incoming network traffic. However, if a match is detected, then the segment enforcer performs the action(s) associated with the policy that is associated with the segment ID in the matched IP address to segment ID mapping.

In step 312, in response to a match between the incoming frame and the IP address to segment ID mapping, the network device forwards at least a portion of the incoming frame towards a redirection server internal to the network device (e.g., 208, FIG. 2). Specifically, in step 312, the payload of the incoming request frame is forwarded towards the internal redirection server in the NOS (e.g., 204, in FIG. 2) of the network device for further processing. The redirection server processes the payload to generate a redirect response. That is, a response payload of the redirection frame is generated by the redirection server using at least a portion of the incoming frame (e.g., a request payload of the incoming frame). In an embodiment of the disclosure, the redirect response may be generated in accordance with the HTTP/1.0 specification and specify response status code "302" and the URL of the captive portal. The redirect response is not limited to the HTTP code 302 and can be other available redirection codes in accordance with the HTTP/1.1 (e.g., codes 303, 307) that may be utilized with a corresponding HTTP server.

The segment enforcer performs the aforementioned redirection action because the source IP address in the incoming frame matches an IP address to segment ID mapping that includes the source IP address and the segment associated with the segment ID is the "default" segment. Further, as discussed above, the "default" segment is associated with a policy, where the policy specifies that an incoming frame for an external destination is to be redirected to the redirection server.

In step 314, the network device hardware receives a redirection frame. The redirection frame has a packaged payload, which includes the redirect response generated by the internal redirection server.

In step 316, the network device transmits the redirection frame towards the host for consummating phase two of the authentication process In step 318, at some later point in time, the network device receives a frame directed to the captive portal. The frame received in step 318 is based on information received by the host via the redirection frame.

In step 320, the segment enforcer matches the frame (i.e., the frame received in step 318) to an IP address to segment ID mapping.

In step 322, in response to a match between the incoming frame and the IP address to segment ID mapping, the network device forwards at least a portion of the frame towards a captive portal for authentication. The segment enforcer performs the aforementioned forwarding action because the source IP address in the incoming frame matches an IP address to segment ID mapping that includes the source IP address and the segment associated with the segment ID is the "default" segment. Further, as discussed above, the "default segment" is associated with a policy, where the policy specifies that an incoming frame that specifies the captive portal as the destination is permitted to be forwarded to the captive portal.

At a later point in time, e.g., after the user has successfully completed web authentication via the captive portal, the captive portal sends a message to the authentication server that the authentication of the user of the host was successful.

In step 324, in response to successful authentication by the captive portal, the network device interacts with the authentication server to obtain a new segment for the host. More specifically, the network device may implement multiple segments, where a host may be associated with one of such segments upon successful authentication by the captive portal. The authentication server may use any known or later discovered mechanism to determine which segment to assign a given host. The new segment is associated with the IP address of the host to generate an updated IP address to segment ID mapping.

In step 326, the network device programs the updated IP address to segment ID mapping into the segment enforcer in the network device hardware. The programming may include programming a TCAM with the new IP address to segment ID mapping, and replacing and/or removing the prior IP address to segment ID mapping from the TCAM (i.e., the IP address to segment ID mapping programmed in step 306). While the aforementioned embodiment discusses a TCAM, the disclosure is not limited to a segment enforcer that is a TCAM.

Following step 326, the host may issue frames directed to external destinations to the network device and the network device (via the segment enforcer) will process such frames in accordance with the segment associated with the segment ID specified in the new IP address to segment ID mapping.

While the method shown in FIGS. 3.1-3.2 outlines authenticating a single host, the method shown in FIGS. 3.1-3.2 may be performed for multiple hosts.

EXAMPLE

The following description includes numbers in brackets, e.g., "[1]". These numbers represent an ordered sequence of steps that are performed in the non-limiting example below. The location of the corresponding circled numbers in FIG. 4 indicate, e.g., the location in the system in which the particular step is being performed. The example is not intended to limit the scope of the disclosure and is merely added to illustrate various embodiments of the disclosure.

Figure 4:
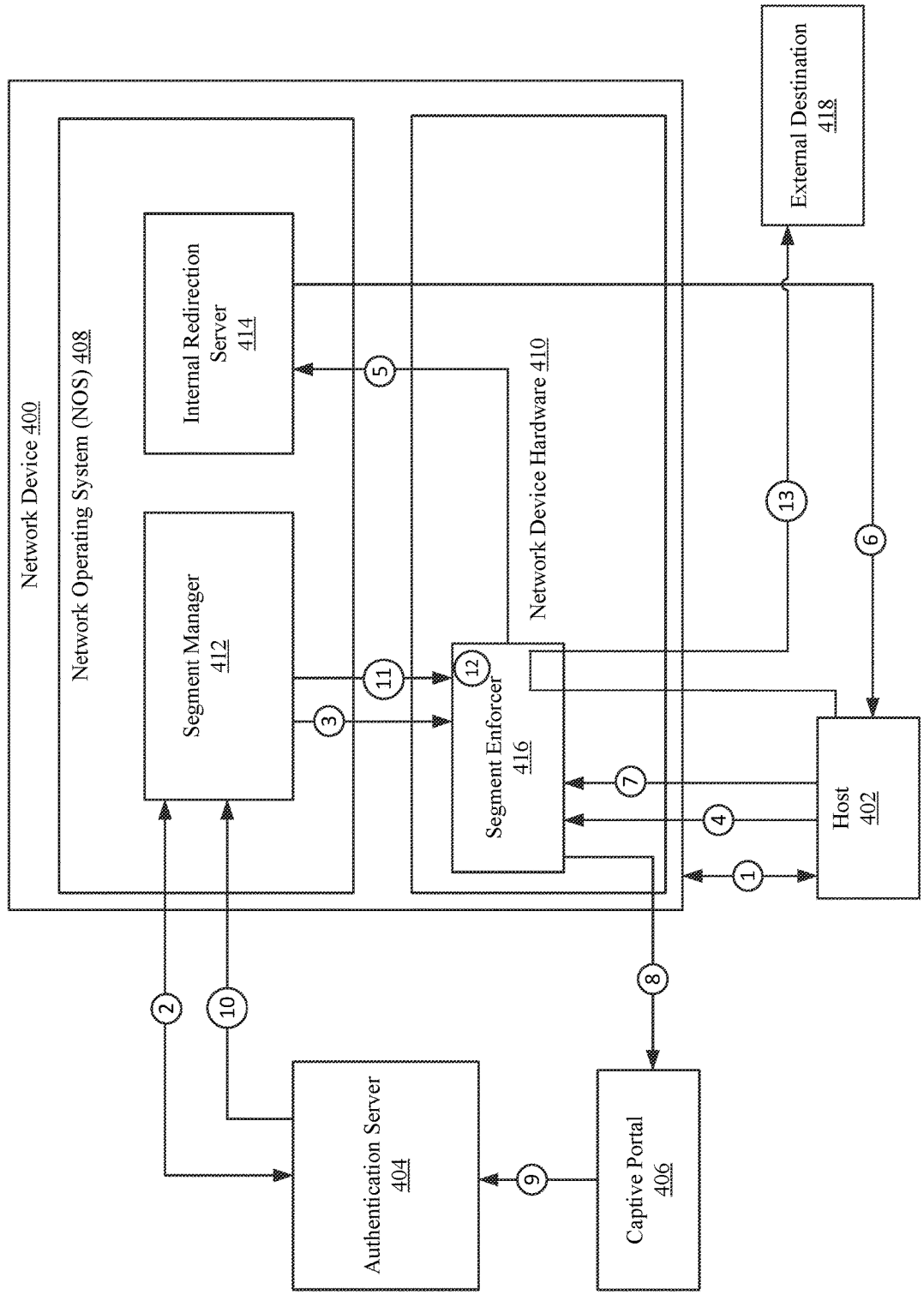
FIG. 4 shows an example in accordance with one or more embodiments of the disclosure.

Turning to the example, with reference to FIG. 4, consider a scenario in which a network device (400) consummates a two-phase web authentication of a host (402) desirous of reaching a website (i.e., a website that cannot be accessed until a user successfully completes the web authentication). At phase one of the two-phase authentication process, the host is authenticated one of two ways, through the IEEE 802.1X protocol or a media access control (MAC) address-based authentication process by an authentication server, such as an authentication server (404) [1]. The authentication server (404) may be configured as an Authentication, Authorization, and Accounting Server (AAA Server) in some embodiments of the disclosure.

Upon successful authentication at phase one of the authentication process, at [2], a segment manager (412) of a network operating system (NOS) (408) of the network device (400) requests web authentication from the authentication server (404). The authentication server (404) responds at the end of phase one of authentication with a MAC address to segment ID mapping, where the segment ID corresponds to the "default" segment. The "default" segment allows matching frames to be redirected to the internal redirection server (414), participation in DHCP and ARP, and the forwarding of frames to the captive portal (406). The segment manager obtains an IP address for the host (402) from a network controller (not shown) and then derives an IP address to segment ID mapping, where the IP address is the IP address of the host and the segment ID corresponds to the "default" segment.

At [3], the segment manager provides the IP address to segment ID mapping to the segment enforcer (416), which subsequently programs a TCAM with the IP address to segment ID mapping. The segment enforcer (prior to the programming) is configured to implement the above actions associated with the "default" segment.

At [4], the segment enforcer (416) receives an incoming frame from the host (402). The incoming frame includes a payload specifying an external server URL (e.g., http://company.com) that the host (402) wishes to reach. The host (402) cannot reach the external server at this time given the lack of successful phase two authentication. The segment enforcer (416) therefore matches the incoming frame to the IP address to segment ID mapping (i.e., determines the frame is associated with the "default" segment). In response to the matching, the segment enforcer forwards (as is permitted within the "default" segment) the request of the incoming frame towards an internal redirection server (414), at [5].

In response to the request, at [6], the network device (400) transmits to the host (402), a redirection response, obtained from an internal redirection server (414). The redirection response includes the URL of the captive portal (406), which is included as a payload packaged into a redirection frame by the network device (400). In one or more embodiments, the URL of the captive portal may be locally configured on the network device or may be obtained from the authentication server.

At [7], the segment enforcer (416) receives a frame from the host (402) directed to the captive portal (406), which the segment enforcer (416) forwards, at [8], by matching the frame, at [7], with IP address to segment ID mapping (i.e., the segment enforcer determines the frame is associated with the "default" segment). At the captive portal (406), the host (402) may authenticate a user and complete phase two of the authentication process by providing authentication credentials of the user at the captive portal (406).

At [9], in response to the successful captive portal authentication, the captive portal sends information related to the successful authentication to the authentication server.

At [10], the authentication server receives the information related to the successful authentication from the authentication server, and determines that the host should be moved from the "default" segment to an "authenticated" segment. In this example, frames associated with the authenticated segment are permitted to be forward towards external destinations (e.g., 418). The authentication server subsequently informs the segment manager that the host is now the authenticated segment.

At [11], the segment manager updates the IP address to segment ID mapping of the host such that the host's IP address is now mapped to the "authenticated" segment.

At [12], the updated IP address to segment ID mapping of the host is then provided to the segment enforcer, where it is subsequently programmed into the TCAM. Further, the prior IP address to segment ID mapping of the host (i.e., the IP address to "default" segment mapping) is removed from the TCAM. The segment enforcer (prior to the programming) is configured to implement the above actions associated with the "authenticated" segment.

At [13], at some later point in time, the host issues a frame with a payload destined for the external destination (418). Because the host is associated with the "authenticated" segment (i.e., based on the updated mapping programmed into the segment enforcer), the frame is forwarded out of the network device towards the external destination.

End of Example

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase connected, or connection, means that there exists between elements/components/devices a direct or indirect connection that allows the elements to interact with one another in some way. For example, the phrase 'connected' may refer to any direct (e.g., wired directly between two devices or components) or indirect (e.g., wired and/or wireless connections between any number of devices or components connecting the connected devices) connection. Thus, any path through which information may travel may be considered a connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a network device, the method comprising:
   receiving, by network device hardware of the network device, an incoming frame originating from a host, wherein the incoming frame comprises an internet protocol (IP) address of the host and a payload specifying information associated with an external server, wherein a user of the host has not been authenticated by a captive portal at a time when the incoming frame is received by the network device hardware;
   determining, using the IP address of the host and an IP address to segment identifier (ID) mapping, that the host is associated with a first segment;
   in response to the determining, forwarding, by the network device hardware, the incoming frame towards a redirection server executing on the network device, wherein the first segment is associated with a first policy and wherein the first policy specifies that the incoming frame is to be forwarded to the redirection server;
   receiving, by the network device hardware, a redirection frame comprises a uniform resource locator (URL) of a captive portal;
   transmitting the redirection frame towards the host, wherein the user of the host is authenticated by the captive portal based, at least in part, on the redirection frame; and
   associating, after the user of the host has been authenticated by the captive portal, the host with a second segment, wherein the segment second permits the host to access the external server.

2. The method of claim 1, wherein the network device permits the forwarding of the incoming frame to the internal redirection server based on the IP address to segment ID mapping.

3. The method of claim 2, wherein a segment enforcer in the network device hardware performs matching of the IP address of the host to the IP address to segment IP mapping in order to permit the forwarding of the incoming frame.

4. The method of claim 3, wherein the segment enforcer comprises a ternary content addressable memory (TCAM) and wherein the IP address to segment ID mapping is programmed into the TCAM.

5. The method of claim 1, further comprising:
   programming the IP address to segment ID mapping into the network device hardware in response to the host being successfully authenticated using media access control (MAC) based authentication (MBA) or IEEE 802.1x Extensible Authentication Protocol (EAP) over LAN (EAPOL).

6. The method of claim 5, wherein in response to the host being successfully authenticated, the network device generates a MAC address to segment ID mapping and wherein the network device derives the IP address to segment ID mapping based on the MAC address to segment ID mapping.

7. The method of claim 6, wherein the IP address is obtained from a network controller connected to the network device.

8. The method of claim 1,
   wherein associating the host with the second segment comprises replacing the IP address to segment ID mapping with a second IP address to segment ID mapping,
   wherein the segment ID in the second IP address to segment ID mapping corresponds to the second segment,
   wherein the second segment is associated with a second policy, and
   wherein the second policy is less restrictive than the first policy.

9. The method of claim 1, wherein the first policy specifies that any frames associated with dynamic host configuration protocol (DHCP) or address resolution protocol (ARP) issued by the host are permitted to be processed, wherein prior to the IP address to segment ID mapping, the frames associated with DHCP and ARP issued by the host are dropped.

10. The method of claim 9, wherein prior to associating the host with the second segment, frames directed to the external server that are issued by the host are dropped.

11. A network device comprising:
   one or more computer processors; and
   a computer-readable storage device comprising instructions that control the one or more computer processors to:
   receive, by network device hardware of the network device, an incoming frame originating from a host, wherein the incoming frame comprises an internet protocol (IP) address of the host and a payload specifying information associated with an external server, wherein a user of the host has not been authenticated by a captive portal at a time when the incoming frame is received by the network device hardware;
   determine, using the IP address of the host and an IP address to segment identifier (ID) mapping, that the host is associated with a first segment;
   in response to determining that the host is associated with a first segment, forward, by the network device hardware, the incoming frame towards a redirection server executing on the network device, wherein the first segment is associated with a first policy and wherein the first policy specifies that the incoming frame is to be forwarded to the redirection server;
   receive, by the network device hardware, a redirection frame comprises a uniform resource locator (URL) of a captive portal;

transmit the redirection frame towards the host, wherein the user of the host is authenticated by the captive portal based, at least in part, on the redirection frame; and associate, after the user of the host has been authenticated by the captive portal, the host with a second segment, wherein the segment second permits the host to access the external server.

12. The network device of claim 11, wherein the network device permits the forwarding of the incoming frame to the internal redirection server based on the IP address to segment ID mapping.

13. The network device of claim 11, wherein the computer-readable storage device further comprises instructions that control the one or more computer processors to program the IP address to segment ID mapping into the network device hardware in response to the host being successfully authenticated using media access control (MAC) based authentication (MBA) or IEEE 802.1x Extensible Authentication Protocol (EAP) over LAN (EAPOL).

14. The network device of claim 11,
wherein associating the host with the second segment comprises replacing the IP address to segment ID mapping with a second IP address to segment ID mapping,
wherein the segment ID in the second IP address to segment ID mapping corresponds to the second segment,
wherein the second segment is associated with a second policy, and
wherein the second policy is less restrictive than the first policy.

15. The network device of claim 11, wherein the first policy specifies that any frames associated with dynamic host configuration protocol (DHCP) or address resolution protocol (ARP) issued by the host are permitted to be processed, wherein prior to the IP address to segment ID mapping, the frames associated with DHCP and ARP issued by the host are dropped.

16. A non-transitory computer-readable storage device in a network device, the non-transitory computer-readable storage device having stored thereon computer executable instructions, which when executed, cause the network device to:
receive, by network device hardware of the network device, an incoming frame originating from a host, wherein the incoming frame comprises an internet protocol (IP) address of the host and a payload specifying information associated with an external server, wherein a user of the host has not been authenticated by a captive portal at a time when the incoming frame is received by the network device hardware;

determine, using the IP address of the host and an IP address to segment identifier (ID) mapping, that the host is associated with a first segment;

in response to determining that the host is associated with a first segment, forward, by the network device hardware, the incoming frame towards a redirection server executing on the network device, wherein the first segment is associated with a first policy and wherein the first policy specifies that the incoming frame is to be forwarded to the redirection server;

receive, by the network device hardware, a redirection frame comprises a uniform resource locator (URL) of a captive portal;

transmit the redirection frame towards the host, wherein the user of the host is authenticated by the captive portal based, at least in part, on the redirection frame; and associate, after the user of the host has been authenticated by the captive portal, the host with a second segment, wherein the segment second permits the host to access the external server.

17. The non-transitory computer-readable storage device of claim 16, wherein the network device permits the forwarding of the incoming frame to the internal redirection server based on the IP address to segment ID mapping.

18. The non-transitory computer-readable storage device of claim 16, wherein the computer executable instructions, which when executed, further cause the network device to program the IP address to segment ID mapping into the network device hardware in response to the host being successfully authenticated using media access control (MAC) based authentication (MBA) or IEEE 802.1x Extensible Authentication Protocol (EAP) over LAN (EAPOL).

19. The non-transitory computer-readable storage device of claim 16,
wherein associating the host with the second segment comprises replacing the IP address to segment ID mapping with a second IP address to segment ID mapping,
wherein the segment ID in the second IP address to segment ID mapping corresponds to the second segment,
wherein the second segment is associated with a second policy, and
wherein the second policy is less restrictive than the first policy.

20. The non-transitory computer-readable storage device of claim 16, wherein the first policy specifies that any frames associated with dynamic host configuration protocol (DHCP) or address resolution protocol (ARP) issued by the host are permitted to be processed, wherein prior to the IP address to segment ID mapping, the frames associated with DHCP and ARP issued by the host are dropped.

* * * * *